United States Patent [19]

Kurtz

[11] Patent Number: 5,587,601
[45] Date of Patent: Dec. 24, 1996

[54] SUPPORT STRUCTURE FOR A SEMICONDUCTOR PRESSURE TRANSDUCER

[75] Inventor: Anthony D. Kurtz, Teaneck, N.J.

[73] Assignee: Kulite Semiconductor Products, Inc., Leonia, N.J.

[21] Appl. No.: 465,120

[22] Filed: Jun. 5, 1995

[51] Int. Cl.$^6$ ............................................. H01L 29/82
[52] U.S. Cl. .................. 257/417; 257/418; 257/419; 257/420; 73/DIG. 4; 73/514.34; 73/721; 73/727
[58] Field of Search ............................... 257/417, 418, 257/419, 420; 73/DIG. 4, 718, 719, 720, 721, 722, 727, 514.34, 514.33, 514.11, 514.12, 514.13

[56] References Cited

U.S. PATENT DOCUMENTS

| | | | |
|---|---|---|---|
| 3,654,579 | 4/1972 | Kurtz et al. | 338/2 |
| 4,040,172 | 8/1977 | Kurtz et al. | 29/580 |
| 4,216,404 | 8/1980 | Kurtz et al. | 310/338 |
| 4,276,533 | 6/1981 | Tominaga et al. | 73/727 X |
| 4,764,747 | 8/1988 | Kurtz et al. | 338/2 |
| 4,800,758 | 1/1989 | Knecht et al. | 73/727 |
| 4,814,856 | 3/1989 | Kurtz et al. | 357/73 |
| 5,485,749 | 1/1996 | Nohara | 73/514.34 |

FOREIGN PATENT DOCUMENTS 0291398 6/1991 Germany ............................ 73/721

*Primary Examiner*—William Mintel
*Attorney, Agent, or Firm*—Plevy & Associates

[57] ABSTRACT

A pressure sensor assembly including semiconductor transducer elements disposed upon a diaphragm support structure, wherein the support structure is comprised of a plurality of substrate layers anodically bonded together. A groove is disposed in the support structure creating an area of reduced thickness within the support structure. The ares of reduced thickness acts as a stress concentration region. As such, the transducer elements are disposed within the ares of reduced thickness so as to efficiently monitor any deformations experienced by the support structure. The groove that creates the ares of reduced thickness is formed in each of the substrate layers, prior to bonding into the overall structure, as such a very accurately tolerance groove can be formed into the structure which greatly increases the reliability of the structure.

16 Claims, 4 Drawing Sheets

SUPPORT STRUCTURE FOR A SEMICONDUCTOR PRESSURE TRANSDUCER

FIELD OF THE INVENTION

The present invention relates in general to pressure sensor assemblies that include semiconductor pressure transducers, and more particularly to the structure that supports the semiconductor transducer within a pressure sensor assembly.

BACKGROUND OF THE INVENTION

Pressure sensor devices have been widely employed in the prior art for various applications and in many different environments. The prior art is replete with a number of patents for pressure sensor devices that employ semiconductor transducer elements. Such transducers typically utilize piezoresistive elements as the force responsive members. By utilizing a semiconductor transducer, the prior art is enabled to provide a reliable pressure sensor that is relatively inexpensive to fabricate and exhibits a high degree of reliability.

As one can ascertain, prior art transducers have been employed in many different environments that subject the transducers to stringent operating conditions such as high temperatures and high pressure. For example, such transducers have been used in the automotive field to monitor engine pressure, coolant pressure and so on. They are used in the aircraft field to measure aerodynamic pressures and in many other varied fields where fluid pressure is a concern. Apart from the high operating temperatures and pressures, the transducers have been subjected to various pollutants and gasses which are present in such environments.

In a sensor assembly that utilizes a semiconductor pressure transducer, typically a piezoresistive element is mounted on, or diffused within, a diaphragm structure. The diaphragm structure is then mechanically, pneumatically or hydraulically coupled to the gas or fluid being monitored so that changes in fluid pressure can cause the diaphragm structure to deform. The deformation of the diaphragm structure is transferred to the piezoresistive element. The resistance of the piezoresistive element varies with the degree of deformation of the diaphragm structure. As a result, the resistance of the piezoresistive element is indicative of the fluid pressure being monitored.

The diaphragm structure is typically fabricated from a semiconductor material, ceramic or glass and is relatively fragile. As one can ascertain, the diaphragm structure is subjected to large changes in pressure and therefore deflect according to the magnitude of such changes in pressure. As indicated, typical prior art diaphragm structures are relatively fragile and are commonly supported by a conventional housing or annular structure. For examples of typical support mechanisms for such diaphragm, reference is made to U.S. Pat. No. 4,216,404 entitled HOUSING AND LEAD ARRANGEMENTS FOR ELECTROMECHANICAL TRANSDUCERS, issued Aug. 5, 1980 to A. D. Kurtz and Joseph R. Mallon, Jr. and assigned to Kulite Semiconductor Products, Inc., the assignee herein. Reference is also made to U.S. Pat. No. 3,654,579 entitled ELECTROMECHANICAL TRANSDUCERS AND HOUSINGS, issued on Apr. 4, 1972 to A. D. Kurtz, Joseph R. Mallon, Jr. and Charles Gravel and assigned to the assignee herein, and U.S. Pat. No. 4,764,747 entitled GLASS HEADER STRUCTURE FOR A SEMICONDUCTOR PRESSURE TRANSDUCER, issued Aug. 16, 1988 to A. D. Kurtz, Joseph R. Mallon and Timothy A. Nun and assigned to the assignee herein.

It has been a major object of the prior art to provide a reliable transducer structure that is both easy to manufacture and inexpensive. A major problem in providing such a transducer relates to the diaphragm structure upon which the piezoresistive elements rest. In forming many diaphragm structures within transducers, the piezoresistive elements are affixed to, or diffused within, a semiconductor or glass substrate. The material of the substrate is then etched away from below the piezoresistive elements so that the substrate is at its thinnest just below the piezoresistive elements. The etched regions operate as stress concentrating areas within the diaphragm support structure and enable the piezoresistive elements to provide a relatively large output upon application of a deflecting force to the diaphragm structure.

When piezoresistive elements are joined to the diaphragm structure, they are conventionally arranged in a Wheatstone bridge circuit having four interconnected piezoresistive elements. As such, it is very important that the thickness of the diaphragm structure be identical below each element. If the thickness of the diaphragm structure varies, the amount of deflection will be unbalance, thereby causing the overall transducer not to be reliable. It is also the function of the diaphragm structure to isolate the piezoresistive elements from the influence of external stresses not caused by a change in the fluid pressure being monitored. Such external stresses may be of mechanical origin, but are commonly caused by a mismatch in the rates of thermal expansion between the material of the piezoresistive elements and the material of the below lying diaphragm structure. If the material of the piezoresistive elements does not match that of the diaphragm structure, the difference in thermal expansion across a given temperature range causes the piezoresistive elements to be falsely stressed, thereby detracting from the reliability of the overall transducer.

It is, therefore, an object of the present invention to provide a diaphragm structure for a semiconductor piezoresistive element that can be etched to exact tolerances so as to evenly support the piezoresistive elements and provide a coefficient of thermal expansion substantially equivalent to that of the piezoresistive elements.

It is a further object of the present invention to provide such a diaphragm structure that is both inexpensive and easy to manufacture and provides superior performance characteristics over comparable prior art structures.

SUMMARY OF THE INVENTION

The present invention discloses a pressure sensor that utilizes semiconductor transducer elements, and more specifically the support structure that supports the semiconductor transducer elements within the pressure sensor. In a preferred embodiment, the support structure is made from a plurality of substrates stacked a top one another so as to form a composite structure. A groove is etched in the top substrate to create an area of reduced thickness within that substrate. The depth of the etching for the first substrate is maintained at a controlled depth so that very accurate dimensions can be produced within the etched groove. The resulting area of reduced thickness acts as a stress concentration point within the first substrate, and it is within this area of reduced thickness that the semiconductor transducer elements are coupled to the first substrate. A second groove is also etched in a second substrate so as to create an area of reduced thickness within the second substrate. The second substrate is then bonded to the bottom of the first substrate, whereby the groove in the first substrate overlaps and communicates with the groove in the second substrate. Once bonded, the area of reduced thickness in the second substrate is removed, thereby exposing the groove within the second substrate. The resulting composite structure has a very accurately etched groove in the top substrate layer that produces an area of reduced thickness in the top layer of exacting tolerances. The overlapping grooves in subsequent substrate layers, allows for a continuous deep groove to be formed through the body of the composite structure, thereby creating a diaphragm structure that has improved performance characteristics comparable to prior art transducers.

When embodied in a pressure sensor, the composite support structure and the semiconductor transducer elements it retains are positioned so as to experience mechanical deformations caused by changes in the pressure of a monitored fluid. Such mechanical deformations are experienced mostly at the area of reduced thickness within the composite support structure. As such, the mechanical deformations are efficiently transmitted into the semiconductor transducer elements positioned on the area of reduced thickness. In a preferred embodiment, the pressure sensor includes a diaphragm structure that includes a rigid region and a flexible region, wherein the flexible region elastically deforms in relation to the changes in fluid pressure being monitored. The present invention support structure with transducer elements is coupled between the rigid region and the flexible region detecting the deflections of the flexible region in relation to the rigid region, thereby providing an indication indicative of the amount of pressure acting upon the flexible region.

BRIEF DESCRIPTION OF THE DRAWINGS

For a better understanding of the present invention, reference is made to the following description of exemplary embodiment thereof, considered in conjunction with the accompanying drawings, in which.

DETAILED DESCRIPTION OF THE INVENTION

Figure 1:
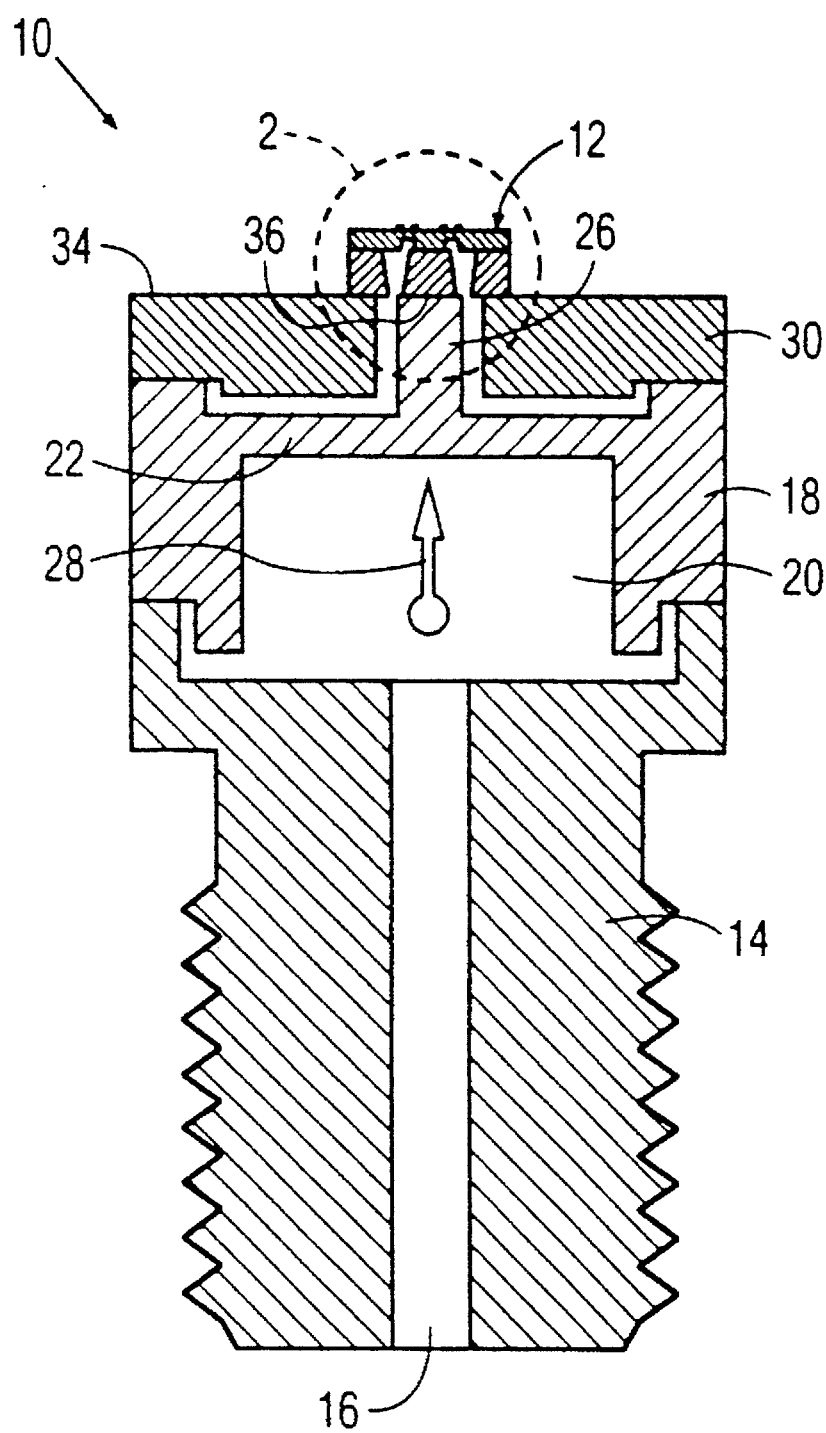
FIG. 1 shows a cross-sectional view of one preferred embodiment of the pressure sensor assembly, including the present invention transducer support structure.

Referring to FIG. 1, a pressure sensor assembly 10 is shown that measures the pressure of a fluid utilizing a semiconductor transducer device 12. In the shown embodiment, the pressure sensor assembly 10 includes a threaded connector 14 through which a fluid conduit 16 is disposed. The threaded connector 14 enables the pressure sensor assembly 10 to be coupled to a pressure vessel or similar pressurized environment that is to be monitored. The threaded connector 14 extends into pressure vessel wherein the fluid conduit 16 extends into, and communicates with, the pressurized fluid to be monitored.

A metal diaphragm structure 18 is attached to the threaded connector 14. The metal diaphragm structure 18 is shaped so that a fluid chamber 20 is formed between the threaded connector 14 and metal diaphragm structure 18 and the fluid conduit 16 communicates with the fluid chamber 20. The metal diaphragm structure 18 includes a thin region 22 that defines the upper surface of the fluid chamber 20. Since the fluid chamber 20 communicates with the fluid conduit 16 and the fluid conduit 16 communicates with the fluid being monitored, the pressure within the fluid chamber 20 changes as the pressure of the monitored fluid changes. The thin region 22 of the metal diaphragm structure 18 deforms as a result in the change in pressure within the fluid chamber 20. As the pressure within the fluid chamber 20 increases over ambient pressure, the pressure differential causes the thin region 22 to bow outwardly in the direction of arrow 28. The degree of deformation of the thin region 22 is proportional to the pressure differential between the fluid chamber 20 and ambient pressure. A push rod 26 is disposed in the center of the thin region 22 of the metal diaphragm structure 18 on the side of the thin region 22 opposite the fluid chamber 20. The push rod 26 is firmly affixed to the center of the thin region 22, as such the push rod 26 moves reciprocally up and down in direction of arrow 28 as the pressure within the fluid chamber 20 varies and the degree of deflection for the thin region 22 varies.

A metal annular member 30 defining an open center aperture 32, is connected to the metal diaphragm structure 18 so that the push rod 26 of the metal diaphragm structure 18 extends through the center aperture 32 of the annular member 30. The annular member 30 does not contact either the thin region 22 of the metal diaphragm structure 18 or the push rod 26 that extends upwardly from the center of the thin region 22. As such, the annular member 30 does not effect the ability of the thin region 22 to deform as the pressure within the below lying fluid chamber 20 varies. The top surface 34 of the annular member 30 lays in the same plane as does the top surface 36 of the push rod 26. The annular member 30 is also made of the same material as the metal diaphragm structure 18. As such, the annular member 30 and the metal diaphragm structure 18 have the same coefficient of thermal expansion. This ensures that the annular member 30 expands and contracts by the same degree as does the push rod 26. Consequently, the top surface 34 of the annular member 30 and the top surface 36 of the push rod 26 remain in the same plane provided both elements are at the same temperature.

Figure 2:
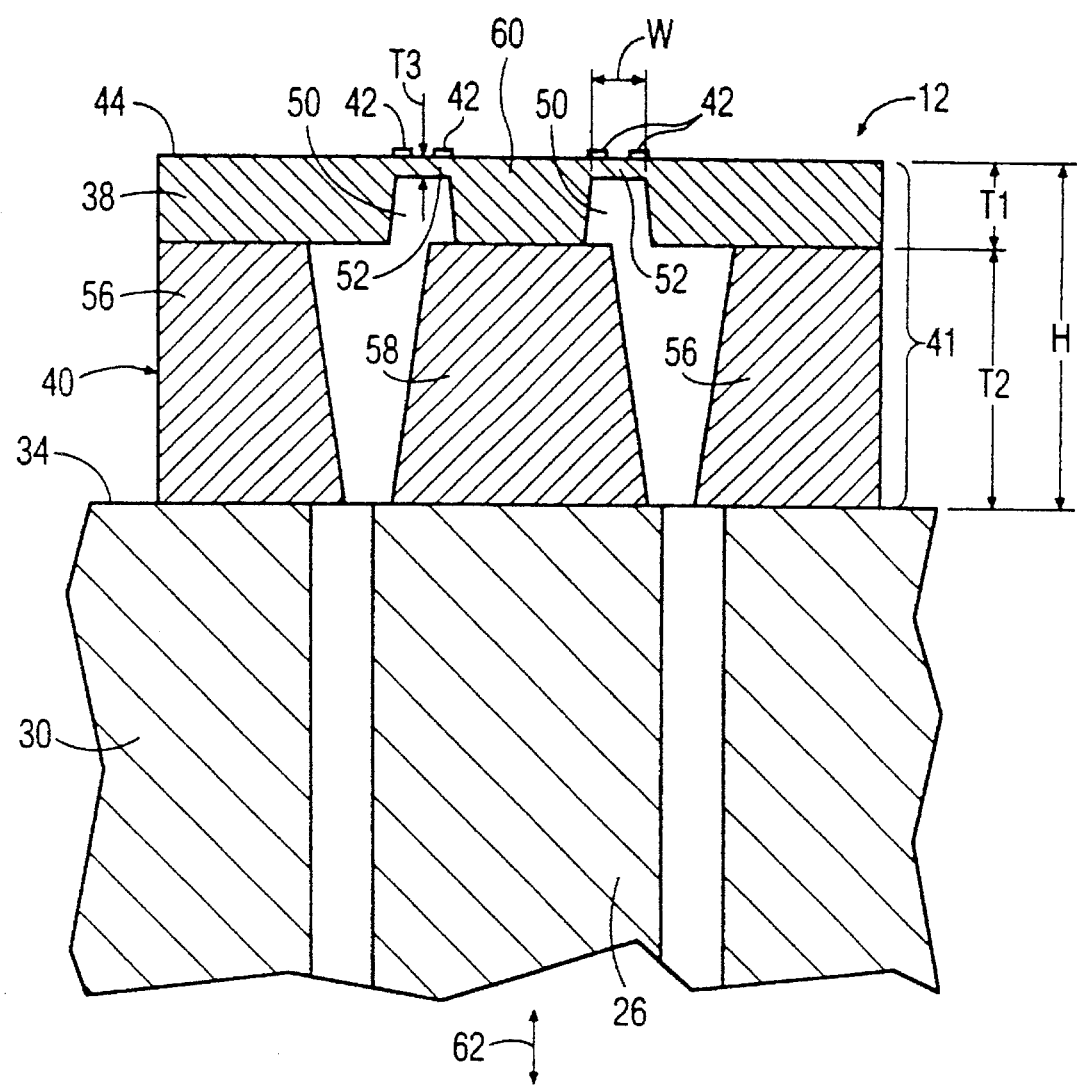
FIG. 2 shows an enlarged view of the segment of FIG. 1 contained within circle 2.
Figure 3A:
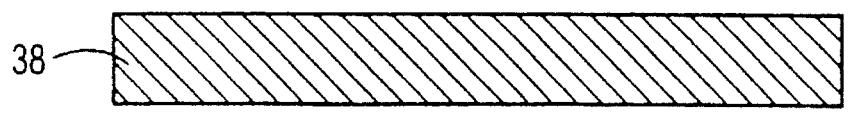
FIG. 3a shows a cross-sectional view of a thin substrate used in the present invention support structure before etching.
Figure 3B:
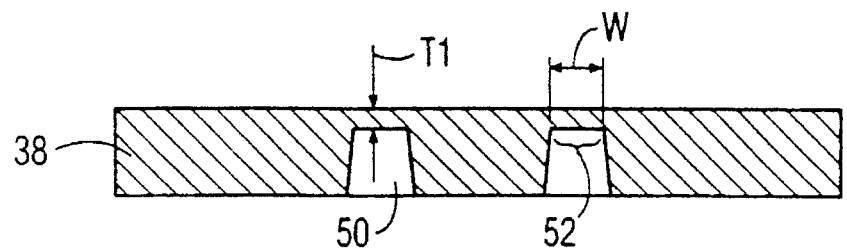
FIG. 3b shows a cross-sectional view of the thin substrate of FIG. 3a after etching.

The semiconductor transducer 12 is disposed across the top surface 34 of the annular member 30 and the top surface 36 of the push rod 26. Referring to FIG. 2, in conjunction with FIG. 1, it can be seen that the semiconductor transducer 12 is comprised of two separate substrate layers 38, 40 stacked atop one another so as to form a support structure 41 having an overall height H. Piezoresistive elements 42 are mounted to, or diffused within, the top surface 44 of the first substrate layer 38 in the same manner as is commonly practiced in the prior art. The piezoresistive elements 42 are preferably configured as a Wheatstone bridge, however, any other practiced configuration for detecting mechanical stresses can also be used. In the embodiment shown, the first substrate layer 38 is preferably made of silicon. The piezoresistive elements 42 are then either diffused into the silicon or are separate silicon based elements coupled to the top surface 44 of the first substrate layer 38. Techniques for diffusing piezoresistive elements within silicon or mounting piezoresistive elements to silicon are well known in the art. See for example U.S. Pat. No. 4,204,185 entitled INTEGRAL TRANSDUCER ASSEMBLIES EMPLOYING THIN HOMOGENEOUS DIAPHRAGMS issued on May 20, 1980 to A. D. Kurtz et al. and U.S. Pat. No. 4,814,856 entitled INTEGRAL TRANSDUCER STRUCTURES EMPLOYING HIGH CONDUCTIVITY SURFACE FEATURES, issued Mar. 21, 1989 to A. D. Kurtz et al., both patents being assigned to the assignee herein.

Since the piezoresistive elements 42 are silicon based and the first substrate layer 38 is silicon, both elements share a generally equivalent coefficient of thermal expansion, thereby preventing stress from occurring between the first substrate layer 38 and the piezoresistive elements 42 based on thermal expansion.

In the embodiment shown, it is desirable to have a support structure 41 that has a large thickness or height H. The thicker the support structure 41 (i.e., the larger the height H) the more isolated the piezoresistive elements 42 are from the metal annular member 30. The support structure 41 is comprised of two substrate layers. As has been described, the first substrate layer 38 is silicon and couples to the piezoresistive elements 42. The second substrate layer 40, that lays between the first substrate layer 38 and the metal annular member 30, is preferably made of the same material as the first substrate layer 38, As such, the second substrate layer 40 is also preferably made of silicon. Since the second substrate layer 40 is made of the same material as the first substrate layer 38, both layers share the same coefficient of thermal expansion. For purposes which will later be explained, the second substrate layer 40 has a thickness T2 which is larger than the thickness T1 of the first substrate layer 38. The second substrate layer 40 joins to the top surface 34 of the annular member 30 and the top surface 36 push rod 26. Since the push rod 26 and the annular member 30 are both a different material from the composition of the second substrate layer 40, a discrepancy occurs between the rate of thermal expansion between the second substrate layer 40 and both the push rod 26 and annular member 30. As a result, undesirable temperature related stresses occur within the second substrate layer 40 from the mismatch in expansion rates. The stresses that occur within the second substrate layer 40 are concentrated along the interface of the second substrate layer 40 and the below lying annular member 30 and push rod 26. The degree of stress decreases in the second substrate layer 40 as one travels away from the interface surface. Consequently, it is desirable to have a second substrate layer 40 with a large thickness T2 in order to minimize the undesired stresses transferred to the first substrate layer 38. For the same reasons, it is desirable to have a large overall support structure 41 with a large height H, so as to minimize undesired stresses acting upon the piezoresistive elements 42.

As can be seen from FIG. 2, a groove 50 is formed within the first substrate layer 38 below the piezoresistive elements 42. The groove 50 is formed in an annular pattern and traverses through most of the material of the first substrate layer 38. Consequently, the groove 50 helps define an annular shape region 52, having a thickness T3 that is much thinner than the rest of the first substrate layer 38. The thin annular region 52 acts as a stress concentration point within the overall support structure 41, whereby any stress deformation within the support structure 41 is mostly experienced at the thin annular region 52. The piezoresistive elements 42 are disposed above the thin annular region 52 so as to measure the deflections experienced across the thin annular region 52.

In a preferred embodiment, the piezoresistive elements 42 are symmetrically disposed above the thin annular region 52 in the configuration of a Wheatstone bridge. As such, it will be understood that in order to ensure the even distribution of stress deformations, it is very critical to form the thin annular region 52 with a consistent thickness T3 and width across its entire length. If the thickness T3 and width W of the thin annular region 52 are not exactly the same around its annular path, the thin annular region 52 will not deform evenly when stressed. As a result, the piezoresistive elements 42 on the thin annular region 52 will not be balanced and will not produce accurate measurements. The thin annular region 52 must be even throughout, in order to support the piezoresistive elements in a balanced fashion and properly support a Wheatstone bridge.

The second substrate layer 40 is not a single piece, but rather is comprised of an annular peripheral support region 56 that surrounds a separate central boss 58. When assembled, the central boss 58 is coupled to the top surface 36 of the push rod 26. Similarly, the opposite side of the central boss 58 is coupled to the center segment 60 of the first substrate layer 38 defined by the groove 50. The annular peripheral support region 56 component of the second substrate layer 40 is coupled to the top surface 34 of the below lying annular member 34. The opposite side of the annular peripheral support region 56 is coupled to the first substrate layer 38 at points beyond the periphery of the groove 50. From this construction, it can be seen that as the push rod 26 moves up and down in the directions of arrow 62, the movement is directly transferred to the central boss 58 of the second substrate layer 40, while the annular peripheral support region 56 of the second substrate layer 40 remains unaffected. The movement of the central boss 58 is then directly transferred to the central segment 60 of the first substrate layer 40, in the center of the groove 50. The movement of the central segment 60 causes the thin annular region 52 to deform, which changes the measured resistance in the piezoresistive elements 42.

As has been previously stated, it is desirable to have an overall support structure 41, that has a large height H. It is also desirable to have a support structure 41 where the thin annular region 52 has a precise thickness T3 and width W. These desirable attributes are opposed to one another during manufacture. Typically, silicon or other glass or ceramic based substrates are etched in order to remove material from the substrates. Exact groove depths and shapes can be etched in such substrates provided such grooves are very deep. However, the deeper the groove is etched, the ability to control the exact depth and shape of the groove deteriorates exponentially. As such, a thick substrate can not be etched to exacting tolerances in an economically feasible manner. 25. Referring to FIG. 3a-6 the present invention method of manufacture will be explained. Starting with the manufacture of the first substrate layer 38, as is used in the previously described embodiments, the first substrate layer 38 is initially provided as a solid, thin substrate. See FIG. 3a. The thin substrate 38 is thin masked and etched to create the annular groove 50. See FIG. 3b. Since the substrate 38 is thin, the groove 50 can be precisely manufactured, thereby evenly forming the thin annular region 52 with thickness T1 and width W.

Figure 4A:
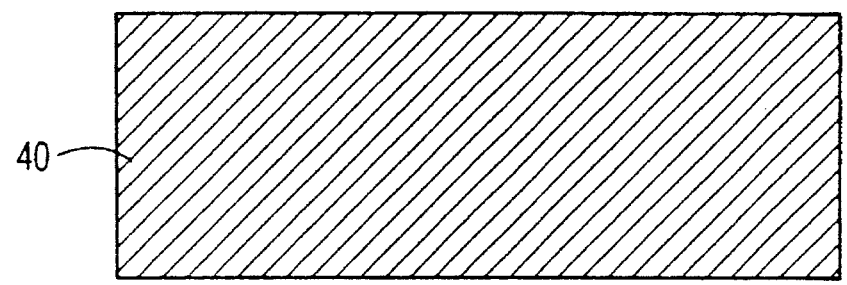
FIG. 4a shows a cross-sectional view of a thick substrate used in the present invention support structure before etching.
Figure 4B:
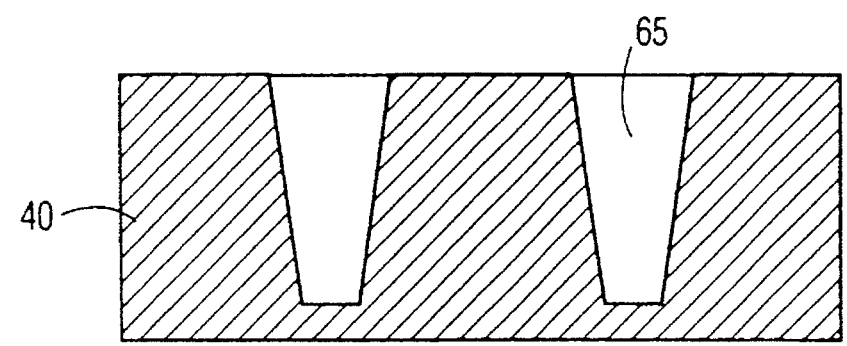
FIG. 4b shows a cross-sectional view of the thick substrate of FIG. 4a after etching.

In FIG. 4a, it can be seen that the manufacture of the second substrate layer 40, as used in the previously described embodiments, begins as a solid thick substrate. Referring to FIG. 4b, the thick substrate 40 is then masked and a large annular groove 65 is etched deep into the substrate. Since the annular groove 65 is deeply etched, the dimensions of the annular groove 65 become increasingly less precise the deeper into the annular groove 65 one measures.

Figure 5:
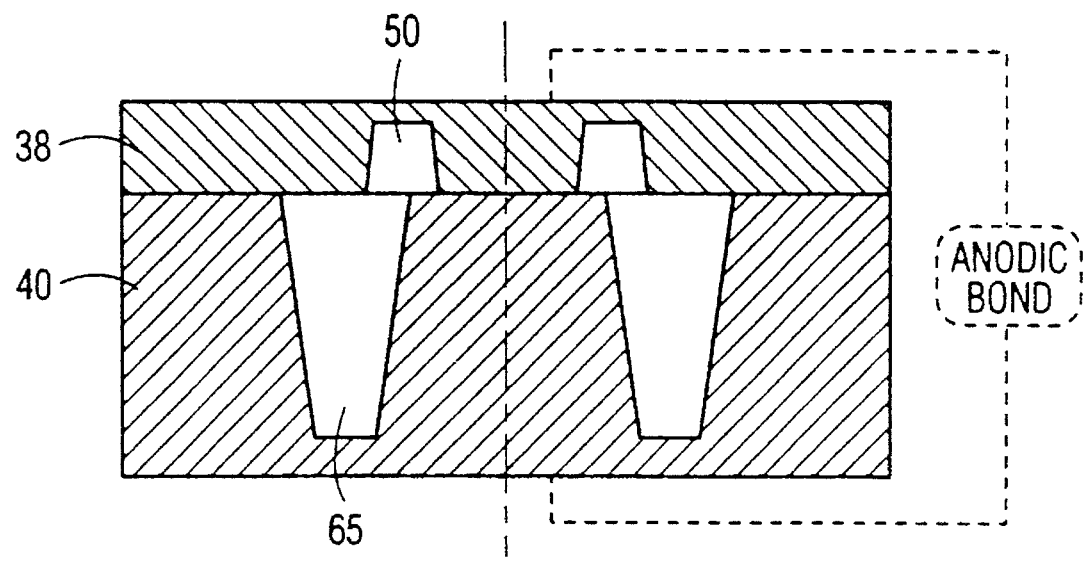
FIG. 5 shows the thin substrate of FIG. 3b joined to the thick substrate of FIG. 4b.
Figure 6:
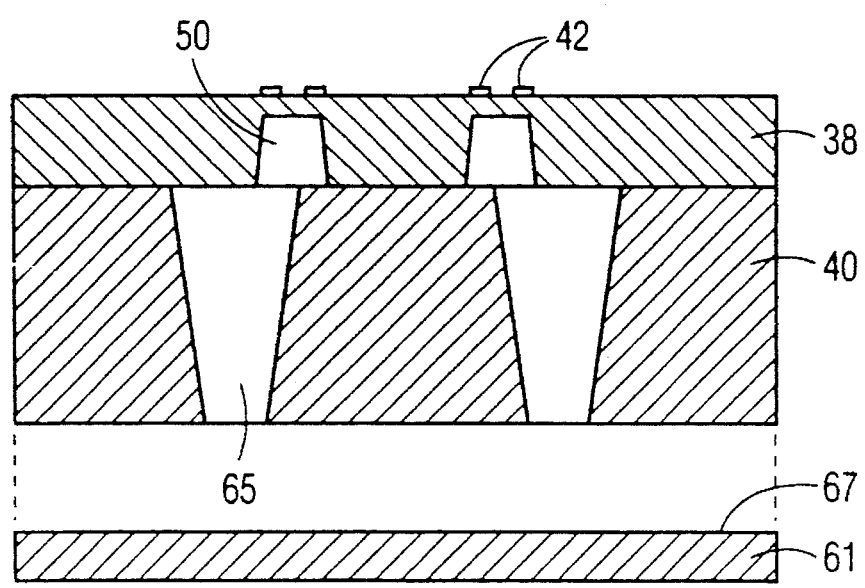
FIG. 6 shows the final composite forming the present invention support structure.

Referring to FIG. 5, it can be seen that the thin substrate 38 is placed over the thick substrate 40 so that the midaxis of the annular groove 50 in the thin substrate 38 aligns with the midaxis of the groove 65 in the thick substrate 40. The thin substrate 38 is then electrostatically bonded to the thick substrate 40 using an anodic bonding technique. Such bonding techniques are well known. For example, see U.S. Pat. No. 4,040,172 entitled METHOD OF MANUFACTURING INTEGRAL TRANSDUCER ASSEMBLIES APPLYING BUILT-IN PRESSURE LIMITING, issued Aug. 9, 1977 to A. D. Kurtz and assigned to the assignee herein. Referring to FIG. 6, it can be seen that once the thin and thick substrates are bonded, the thick substrate 40 is cut along line 67, and the bottom region 61 of the thick substrate 40 is removed. As a result, the composite present invention support structure 41 is created. This support structure 41 can now have the piezoresistive elements 42 either diffused with, or coupled to its top surface and the resulting transducer assembly can be coupled to sensor assembly, as was initially shown in FIG. 1.

From the foregoing, it will be apparent that many new and heretofore, unobtainable support structures can be obtained from the basic concepts disclosed herein without departing from the spirit and ideas of this invention. It will therefore be understood that the embodiment described herein is merely exemplary and that a person skilled in the art may make variations and modifications to the embodiment described. More specifically, substrates such as glass, ceramic and other semiconductive materials can be used in place of the silicon substrates described. Furthermore, many different sensor assemblies can be used in conjunction with the present invention transducer support structure to provide mechanical stresses to the structure corresponding to pressure changes. All such equivalent components, variations and modifications are intended to be included within the scope of this invention as defined by the appended claims.

What is claimed is:

1. A support structure for semiconductor transducer elements in a pressure transducer assembly, comprising:
   a plurality of semiconductive substrates arranged in a composite structure having a top substrate layer, upon which said transducer elements are disposed, and at least one lower substrate layer, wherein a first groove is disposed in said top substrate layer creating an area of reduced thickness in said top substrate layer below said transducer elements and a second groove is disposed through said at least one lower substrate layer that communicates with said first groove, thereby creating a continuous open region through said composite structure below said area of reduced thickness, said second groove being continuous thereby defining the periphery of a boss region in said at least one lower substrate layer that is coupled to said top substrate layer.

2. The support structure according to claim 1, wherein said first groove is continuous, defining the periphery of a contact region in said top substrate layer and said boss region in said at least one lower substrate layer being coupled to said contact region in said top substrate layer, whereby a force applied to said boss region is transferred to said contact region and is experience across said area of reduced thickness.

3. The support structure according to claim 1, wherein said at least one lower substrate layer has a thickness that is greater than that of said top substrate layer.

4. The support structure according to claim 1, wherein said at least one lower substrate layer is a single homogenous substrate.

5. The support structure according to claim 1, wherein said top substrate layer and said at least one lower substrate layer each have substantially the same coefficient of thermal expansion.

6. The support structure according to claim 5, wherein said top substrate layer has generally the same coefficient of thermal expansion as said transducer elements.

7. The support structure according to claim 2, wherein said first groove and said second groove are both annular in shape.

8. The support structure according to claim 1, wherein said top substrate layer and said at least one lower substrate layer are anodically bonded together.

9. The support structure according to claim 1, wherein said top substrate layer and said at least one lower substrate are silicon based.

10. A pressure sensor for measuring the pressure of a fluid in a vessel, comprising:
    a coupling member for engaging said vessel, said coupling member having a conduit disposed therethrough that communicates with said fluid contained with said vessel;
    a diaphragm structure, having a rigid region and a flexible region, joined to said coupling member, wherein said flexible region communicates with said fluid via said conduit and pressure changes within said fluid cause said flexible region to deform in relation to said rigid region;
    a transducer support structure coupled to said diaphragm structure between said rigid region and said flexible region, said transducer support structure including a plurality of substrate layers arranged in a composite structure having a top substrate layer and at least one lower substrate layer, wherein a first groove is disposed in said top substrate layer creating an area of reduced thickness in said top substrate layer and a second groove is disposed through said at least one lower substrate layer that communicates with said first groove, thereby creating a continuous open region through said composite structure below said area of reduced thickness wherein said open region is disposed between said rigid region and said flexible region and deformations in said flexible region relative said rigid region are experienced at said area of reduced thickness, said second groove being annular and defining the periphery of a boss region in said at least one lower substrate layer that is coupled to said top substrate layer; and
    at least one transducer element disposed on said top substrate layer above said area of reduced thickness wherein said at least one transducer element detects the degree of deformation experienced by said area of reduced thickness.

11. The pressure sensor according to claim 10, wherein said first groove is annular, defining the periphery of a contact region in said top substrate layer and said boss region in said at least one lower substrate layer being coupled to said contact region in said top substrate layer, whereby a force applied to said boss region is transferred to said contact region and is experienced across said area of reduced thickness.

12. The pressure sensor according to claim 11, wherein a pushrod extends from said flexible region of said diaphragm structure, said pushrod moving reciprocally as said flexible region deforms with changes in fluid pressure, said pushrod terminating in a common plane with at least one surface of said rigid region of said diaphragm structure at ambient pressure, wherein said transducer support structure is coupled to said at least one surface of said rigid region so that said boss region of said at least one lower substrate layer is engaged by said pushrod, whereby the movement of said pushrod is experienced by said area of reduced thickness.

13. The pressure sensor according to claim 10, wherein said at least one lower substrate layer has a thickness that is greater than that of said top substrate layer.

14. The pressure sensor according to claim 10, wherein said top substrate layer and said at least one lower substrate layer each have substantially the same coefficient of thermal expansion.

15. The pressure sensor according to claim 14, wherein said at least one lower substrate layer is a single layer of semiconductive material.

16. The pressure sensor according to claim 12, wherein said rigid region and said flexible region of said diaphragm structure have a generally equivalent coefficient of thermal expansion.

* * * * *